US008213134B2

(12) United States Patent
Dishman et al.

(10) Patent No.: US 8,213,134 B2
(45) Date of Patent: Jul. 3, 2012

(54) APPARATUS, SYSTEM, AND METHOD TO PREVENT SMOKE IN A POWER SUPPLY POWERED BY A CURRENT LIMITED SOURCE

(75) Inventors: C. Charles Dishman, Raleigh, NC (US); Jen-Ching Lin, Apex, NC (US); Randhir S. Malik, Cary, NC (US)

(73) Assignee: International Business Machines Corporation, Armonk, NY (US)

( * ) Notice: Subject to any disclaimer, the term of this patent is extended or adjusted under 35 U.S.C. 154(b) by 777 days.

(21) Appl. No.: 12/346,440

(22) Filed: Dec. 30, 2008

(65) Prior Publication Data

US 2010/0165526 A1     Jul. 1, 2010

(51) Int. Cl.
*H01H 9/30* (2006.01)
(52) U.S. Cl. ......................................... 361/13
(58) Field of Classification Search ................. 361/13
See application file for complete search history.

(56) References Cited

U.S. PATENT DOCUMENTS

| 5,530,613 | A | | 6/1996 | Bauer et al. |
| 5,666,254 | A | * | 9/1997 | Thomas et al. ............... 361/8 |
| 5,680,034 | A | * | 10/1997 | Redl ........................ 363/21.03 |
| 5,886,860 | A | | 3/1999 | Chen et al. |
| 5,995,392 | A | * | 11/1999 | Turner ......................... 363/49 |
| 6,285,170 | B1 | * | 9/2001 | Matsumoto et al. .......... 323/222 |
| 6,331,763 | B1 | * | 12/2001 | Thomas et al. ............... 320/136 |
| 6,628,485 | B1 | | 9/2003 | Rajala et al. |
| 6,806,806 | B2 | | 10/2004 | Anthony |
| 2003/0027447 | A1 | | 2/2003 | Cooper et al. |
| 2007/0166942 | A1 | | 7/2007 | Cogan et al. |

* cited by examiner

*Primary Examiner* — Jared Fureman
*Assistant Examiner* — Nicholas Ieva
(74) *Attorney, Agent, or Firm* — Kunzler Needham Massey & Thorpe

(57) ABSTRACT

A positive temperature coefficient device is configured in parallel with a bypass switch and implemented at an input to a switching regulation stage of a switching power supply. A monitoring module determines that a voltage across the regulation switch in the switching power supply is below a predefined threshold voltage for greater than a predefined threshold time period. A control module controls operation of the bypass switch. The control module opens the bypass switch in response to the monitoring module determining that the voltage across the regulation switch is below the predefined threshold voltage for greater than the predefined threshold time period such that substantially all of the current entering the switching regulation stage passes through the PTC device. By causing substantially all of the current to pass through the PTC device, the device will enter a high impedance state thereby preventing smoke and smell from occurring.

20 Claims, 7 Drawing Sheets

APPARATUS, SYSTEM, AND METHOD TO PREVENT SMOKE IN A POWER SUPPLY POWERED BY A CURRENT LIMITED SOURCE

BACKGROUND

1. Field of the Invention

This invention relates to power supplies and more particularly relates to preventing smoke and smell in a power supply powered by a current limited source.

2. Description of the Related Art

A power supply, sometimes known as a power supply unit or PSU, is a device or system that supplies electrical or other types of energy to a load or group of loads. A power supply, in some embodiments may be configured to convert power in one form to another form, such as converting alternating current ("AC") power to direct current ("DC") power. The regulation of power supplies is typically done by incorporating circuitry to tightly control the output voltage and/or current of the power supply to a specific value. The specific value is typically closely maintained despite variations in the load presented to the power supply's output, or any reasonable voltage variation at the power supply's input.

For example, in an electronic device such as a computer, the power supply is typically designed to convert an AC voltage input such as is traditionally provided by a conventional wall socket, into several low-voltage DC power outputs for transmission to the internal components of the electronic device. Conversion is typically performed in stages that may include various stages such as a rectification stage, a pre-regulation stage such as an active harmonic filter, a regulator/chopper stage, etc. The stages may be configured in various topologies such as a boost stage, a buck stage, or other derivative topology.

A switching power supply incorporates a switching regulator within one or more stages of the power supply to regulate the output voltage of the power supply. A switching regulator typically includes a switch such as a metal-oxide-semiconductor field-effect transistor ("MOSFET") that is turned on and off to regulate the output voltage. One common type of fault in switching power supplies is that a short circuit occurs across a switching MOSFET causing the power supply to draw too much current which can result in smoke or even fire.

Power supplies are typically fitted with a current protection device, such as a fuse, so that in the event of a short circuit, the current protection device will trigger thereby preventing smoke or fire from occurring. However, in some cases, such as when a current limited source is used to provide input power to the power supply, it is possible for a short circuit to occur that fails to properly trigger the current protection device. For example, suppose the current limited source is limited to provide less current than is necessary to trip a fuse. In such a case, even though not enough current is being drawn to trip the current protection device, the short circuit may still cause too much current to flow through vulnerable components in the power supply which may result in smoke and smell.

For example, conventional power supplies may utilize a negative temperature coefficient ("NTC") device in parallel with a relay switch at an input to a switching regulation stage of a power supply. An NTC device is a device that decreases in electrical resistivity as the temperature of the device increases (i.e. higher current results in lower resistance). At startup, the relay switch is in an open position and all of the current passes through the NTC device until the output voltage reaches some threshold. The NTC device acts to slow the input current to the power supply at startup to prevent damage to the power supply components.

Once the output voltage reaches an acceptable threshold, the relay is closed so that substantially all of the current passes through the relay, the relay switch having less resistance than the NTC device. In the event, of a MOSFET short circuit, the relay switch will re-open and substantially all of the current will again pass through the NTC device. However, because of the MOSFET short-circuit too much current will pass through the NTC device as it decreases in resistance causing the device to emit smoke and smell. The present invention resolves the problems associated with the prior art.

BRIEF SUMMARY

From the foregoing discussion, it should be apparent that a need exists for an apparatus, system, and method that prevent smoke and smell in faulty power supplies, and especially in faulty power supplies with a current limited source. Beneficially, such an apparatus, system, and method would prevent smoke and smell from occurring in the event of short circuits across power supply components. In one embodiment, the invention is accomplished by utilizing a positive temperature coefficient ("PTC") in parallel with a relay switch at the input of a switching regulation stage of a power supply. A PTC device is a device that increases in electrical resistance as the temperature of the device increases. Thus, as current through the device increase, the temperature will also increase which will ultimately result in an increase in resistance of the device thereby limiting the amount of current that can pass through the device.

Thus, when a switching MOSFET or other component fails in a short circuit condition, the relay switch will open causing substantially all of the current entering the switching regulation stage to pass through the PTC device. This will cause the PTC device to enter a high impedance state which will limit the amount of current passing into the regulation stage thereby preventing smoke or smell from occurring. The present invention prevents smoke and smell even if a current protection device (i.e. fuse) fails to trigger in the power supply or where a current limited source provides less current than the current rating of the current protection device.

The present invention has been developed in response to the present state of the art, and in particular, in response to the problems and needs in the art that have not yet been fully solved by currently available power supplies and regulators. Accordingly, the present invention has been developed to provide an apparatus, system, and method for preventing smoke and smell in a power supply.

The apparatus is provided with a PTC device and a plurality of modules including monitoring module and a control module. The PTC device is configured in parallel with a bypass switch and implemented at an input to a switching regulation stage of a switching power supply. The PTC device is a device that increases in electrical resistance in response to an increase in temperature. The switching regulation stage includes a regulation switch, such as a MOSFET switch, that is switched on and off to maintain an output voltage of the switching regulation stage.

The monitoring module determines that a voltage across the regulation switch in the switching power supply is below a predefined threshold voltage for greater than a predefined threshold time period. Such a condition may indicate a fault in the power supply.

The control module controls operation of the bypass switch. The control module opens the bypass switch in response to the monitoring module determining that the voltage across the regulation switch is below the predefined threshold voltage for greater than the predefined threshold time period such that substantially all of the current entering the switching regulation stage passes through the PTC device. Prior to opening the bypass switch, the control module maintains the bypass switch in a closed position such that substantially all of the current entering the switching regulation stage passes through the closed bypass switch. By causing substantially all of the current to pass through the PTC device, the device will enter a high impedance state thereby preventing smoke and smell from occurring.

In one embodiment, a startup module may also be provided. The startup module controls the bypass switch during startup of the switching power supply. The startup module maintains the bypass switch in an open position in response to startup of the switching power supply such that substantially all of the current entering the switching regulation stage passes through the PTC device. This slows the current flow into the regulation stage in order to protect the components of the power supply. The startup module closes the bypass switch in response to determining that a voltage of a predetermined node in the switching power supply is greater than a startup voltage threshold such that substantially all of the current entering the switching regulation stage passes through the bypass switch.

In one embodiment, determining that a voltage of a predetermined node is greater than a startup voltage threshold includes determining that an output voltage of the switching regulation stage is greater than the startup voltage threshold. In a further embodiment, the switching regulation stage may include a boost stage wherein the determined output voltage comprises an output voltage of the boost stage. In another embodiment, determining that a voltage of a predetermined node is greater than a startup voltage threshold comprises determining that a voltage across the regulation switch is greater than the startup voltage threshold. In yet another embodiment, determining that a voltage of a predetermined node is greater than a startup voltage threshold includes determining that an output voltage of the switching power supply is greater than the startup voltage threshold.

In one embodiment, the switching power supply may include a current protection device that disconnects power to the switching power supply in response to an over-current condition in the switching power supply. In such an embodiment, the switching power supply may be configured to receive input power from a current limited power source, and the current limited power source may be configured to supply less current than is sufficient to trigger disconnection of the current protection device. In various embodiments, the current protection device may include one or more of a fuse and a circuit breaker.

In a further embodiment of the apparatus, the apparatus may include a bias voltage regulator that provides a regulated bias voltage to at least one component of the control module. The bias voltage regulator may be configured to connect to and receive an input voltage from a node between the temperature coefficient device and a power source that provides power to the switching power supply. In a further embodiment, the bias voltage regulator shares an input node with the PTC device such that the bias voltage regulator and the PTC device receive a same input voltage. In yet a further embodiment, the bias voltage regulator continues providing a regulated bias voltage to the one or more components of the control module during operation of the bypass switch in an open state.

In one embodiment, the PTC device includes a polymer PTC ("PPTC") device. In additional embodiments, the bypass switch includes a solid state relay or an electromechanical relay. In yet another embodiment, the regulation switch includes a metal-oxide-semiconductor field-effect transistor ("MOSFET"). In one embodiment, the switching regulation stage is configured such that a short across the regulation switch results in an increased current flow into the switching power supply that is greater than a maximum rated input current for the switching power supply.

A system of the present invention is also presented that substantially includes the modules and embodiments described above with regard to the apparatus. The system typically includes a switching power supply configured to provide power to one or more electronic devices where the power supply includes a PTC device in parallel with a bypass switch, a monitoring module, and a control module as described above.

The PTC device is configured in parallel with a bypass switch and implemented at an input to a switching regulation stage of a switching power supply. The PTC device is a device that increases in electrical resistance in response to an increase in temperature. The switching regulation stage includes a regulation switch, such as a MOSFET switch, that is switched on and off to maintain an output voltage of the switching regulation stage.

The monitoring module determines that a voltage across the regulation switch in the switching power supply is below a predefined threshold voltage for greater than a predefined threshold time period. Such a condition may indicate a fault in the power supply.

The control module controls operation of the bypass switch. The control module opens the bypass switch in response to the monitoring module determining that the voltage across the regulation switch is below the predefined threshold voltage for greater than the predefined threshold time period such that substantially all of the current entering the switching regulation stage passes through the PTC device. Prior to opening the bypass switch, the control module maintains the bypass switch in a closed position such that substantially all of the current entering the switching regulation stage passes through the closed bypass switch. By causing substantially all of the current to pass through the PTC device, the device will enter a high impedance state thereby preventing smoke and smell from occurring.

In one embodiment, the system may also include one or more electronic devices that receive regulated power from the switching power supply. In further embodiments, at least one of the one or more electronic devices is one of a blade server, peripheral component interconnect ("PCI") card, personal computer, laptop, router, switch, personal digital assistant, appliance, and digital media player.

A method of the present invention is also presented for preventing smoke in a power supply. The method in the disclosed embodiments substantially includes the steps necessary to carry out the functions presented above with respect to the operation of the described apparatus and system. In one embodiment, the method includes configuring the PTC device in parallel with a bypass switch and implementing the PTC device at an input to a switching regulation stage of a switching power supply. The PTC device is a device that increases in electrical resistance in response to an increase in temperature. The switching regulation stage includes a regulation switch, such as a MOSFET switch, that is switched on and off to maintain an output voltage of the switching regulation stage.

The method also includes determining with a monitoring module that a voltage across the regulation switch in the switching power supply is below a predefined threshold voltage for greater than a predefined threshold time period. Such a condition may indicate a fault in the power supply.

The method also includes controlling with a control module operation of the bypass switch. The control module opens the bypass switch in response to the monitoring module determining that the voltage across the regulation switch is below the predefined threshold voltage for greater than the predefined threshold time period such that substantially all of the current entering the switching regulation stage passes through the PTC device. Prior to opening the bypass switch, the control module maintains the bypass switch in a closed position such that substantially all of the current entering the switching regulation stage passes through the closed bypass switch. By causing substantially all of the current to pass through the PTC device, the device will enter a high impedance state thereby preventing smoke and smell from occurring.

Reference throughout this specification to features, advantages, or similar language does not imply that all of the features and advantages that may be realized with the present invention should be or are in any single embodiment of the invention. Rather, language referring to the features and advantages is understood to mean that a specific feature, advantage, or characteristic described in connection with an embodiment is included in at least one embodiment of the present invention. Thus, discussion of the features and advantages, and similar language, throughout this specification may, but do not necessarily, refer to the same embodiment.

Furthermore, the described features, advantages, and characteristics of the invention may be combined in any suitable manner in one or more embodiments. One skilled in the relevant art will recognize that the invention may be practiced without one or more of the specific features or advantages of a particular embodiment. In other instances, additional features and advantages may be recognized in certain embodiments that may not be present in all embodiments of the invention.

These features and advantages of the present invention will become more fully apparent from the following description and appended claims, or may be learned by the practice of the invention as set forth hereinafter.

BRIEF DESCRIPTION OF THE DRAWINGS

In order that the advantages of the invention will be readily understood, a more particular description of the invention briefly described above will be rendered by reference to specific embodiments that are illustrated in the appended drawings. Understanding that these drawings depict only typical embodiments of the invention and are not therefore to be considered to be limiting of its scope, the invention will be described and explained with additional specificity and detail through the use of the accompanying drawings, in which.

DETAILED DESCRIPTION

Figure 1:
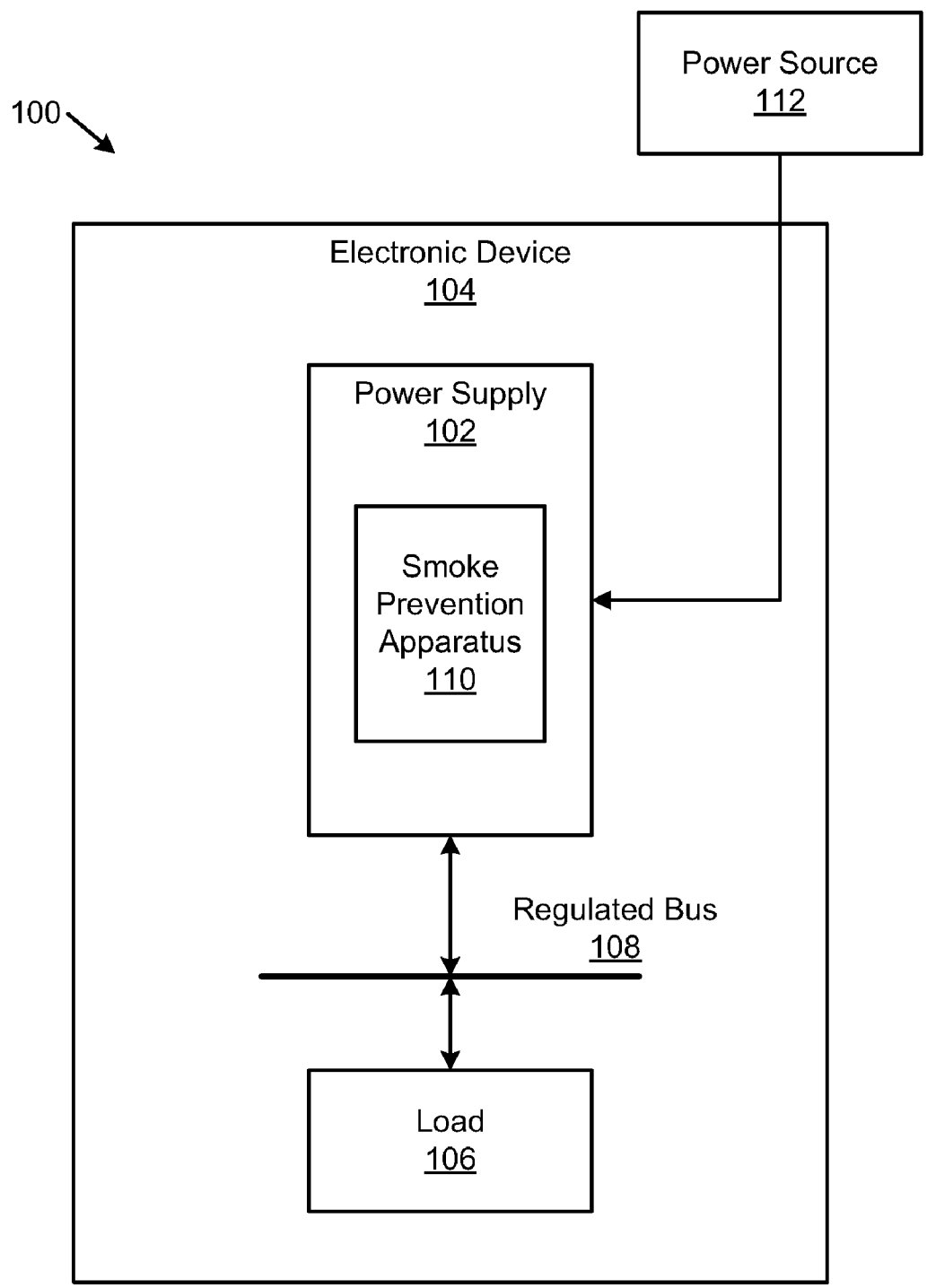
FIG. 1 is a schematic block diagram illustrating one embodiment of a system for preventing smoke and smell in a power supply in accordance with the present invention.

Many of the functional units described in this specification have been labeled as modules, in order to more particularly emphasize their implementation independence. For example, a module may be implemented as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in software for execution by various types of processors. An identified module of executable code may, for instance, comprise one or more physical or logical blocks of computer instructions which may, for instance, be organized as an object, procedure, or function. Nevertheless, the executables of an identified module need not be physically located together, but may comprise disparate instructions stored in different locations which, when joined logically together, comprise the module and achieve the stated purpose for the module.

Indeed, a module of executable code may be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices, and may exist, at least partially, merely as electronic signals on a system or network. Where a module or portions of a module are implemented in software, the software portions are stored on one or more computer readable media.

Reference throughout this specification to "one embodiment," "an embodiment," or similar language means that a particular feature, structure, or characteristic described in connection with the embodiment is included in at least one embodiment of the present invention. Thus, appearances of the phrases "in one embodiment," "in an embodiment," and similar language throughout this specification may, but do not necessarily, all refer to the same embodiment.

Reference to a computer readable medium may take any form capable of storing machine-readable instructions on a digital processing apparatus. A computer readable medium may be embodied by a transmission line, a compact disk, digital-video disk, a magnetic tape, a Bernoulli drive, a magnetic disk, a punch card, flash memory, integrated circuits, or other digital processing apparatus memory device.

Furthermore, the described features, structures, or characteristics of the invention may be combined in any suitable manner in one or more embodiments. In the following description, numerous specific details are provided, such as examples of programming, software modules, user selections, network transactions, database queries, database structures, hardware modules, hardware circuits, hardware chips, etc., to provide a thorough understanding of embodiments of the invention. One skilled in the relevant art will recognize, however, that the invention may be practiced without one or more of the specific details, or with other methods, components, materials, and so forth. In other instances, well-known structures, materials, or operations are not shown or described in detail to avoid obscuring aspects of the invention.

The schematic flow chart diagrams included herein are generally set forth as logical flow chart diagrams. As such, the depicted order and labeled steps are indicative of one embodiment of the presented method. Other steps and methods may be conceived that are equivalent in function, logic, or effect to one or more steps, or portions thereof, of the illustrated method. Additionally, the format and symbols employed are provided to explain the logical steps of the method and are understood not to limit the scope of the method. Although various arrow types and line types may be employed in the flow chart diagrams, they are understood not to limit the scope of the corresponding method. Indeed, some arrows or other connectors may be used to indicate only the logical flow of the method. For instance, an arrow may indicate a waiting or monitoring period of unspecified duration between enumerated steps of the depicted method. Additionally, the order in which a particular method occurs may or may not strictly adhere to the order of the corresponding steps shown.

FIG. 1 is a schematic block diagram illustrating one embodiment of a system 100 for preventing smoke and smell in a power supply in accordance with the present invention. The system 100 includes a power supply 102, an electronic device 104, a load 106, a regulated bus 108. As depicted, the power supply 102 includes a smoke prevention apparatus 110. The power supply 102 receives input from a power source 112.

In the illustrated embodiment, the power supply 102 provides regulated power to the electronic device 104 to power various electronic systems and subsystems within the electronic device 104. The power supply 102 is typically connected to the electronic device 104 by a regulated bus 108 or similar device. The regulated bus 108 and power supply 102 may be configured to provide one or more different voltages and currents to the electronic device 104. For example, in a typical power supply, voltages of +12 v, +5 v, +3.3 v, and −12 v are commonly provided. Preferably the power supply 102 is a switching power supply. As will be recognized by those of skill in the art a switching power supply or switched-mode power supply ("SMPS") is a power supply that incorporates a switching regulator. A switching regulator regulates power by switching a transistor or other switch on and off with a variable duty cycle to produce a desired output signal.

In various embodiments, the electronic device 104 may be a computer system, such as a desktop, laptop, or server, and the power supply 102 may be configured to provide power to the various components of the computer system. In other embodiments, the electronic device 104 may include devices such as a blade server, a peripheral component interconnect ("PCI") card, routers, personal digital assistants (PDAs), switches, appliances, digital media players, displays, or other electronic devices as recognized by one of skill in the art. In one embodiment, the power supply 102 may be implemented within the same enclosure as the electronic device 104, such as within a computer tower case. In other embodiments, the power supply 102 may be implemented external to the electronic device 104 and may be connected to the electronic device 104 via a connection means such as a cord, cable, or bus such as in a blade center.

The electronic device 104 causes a load 106 to be applied to the power supply 102. The amount of load 106 may affect the performance of the power supply 102. The power supply 102 is preferably configured to operate efficiently in conjunction with a specified load 106. In one embodiment, the load 106 may vary depending on the operation characteristics of the electronic device 104 and the power supply 102 may be configured to adjust accordingly. For example, the power supply 102 may include a feedback signal for adjusting the power output characteristics of the power supply 102 in response to changes in the load 106. Typically, the power supply 102 regulates the voltage on the regulated bus 108 so as to provide substantially constant voltage levels to the electronic device 104 under varying load conditions. In various embodiments, the load 106 may be inside the electronic device 104, outside the electronic device 104, or both.

The power source 112 is configured to supply input power to the power supply 102. Typically, the power source 112 is a public utility or the like that provides power to homes and business via power lines. Power is then delivered to the power supply 102 via a conventional wall socket or by other means known to those of skill in the art. In some embodiments, the power source 112 may comprise a generator, backup power source, power supply, or other power component.

In some embodiments, the power source 112 is a current limited power source 112 that is configured to impose an upper limit of current that is allowed to pass from the power source 112 to the power supply 102. For example, in order to protect circuitry in the power supply 102 or electronic device 104, the power source 112 may be configured to supply only an amount of current that will not cause damage to particular electrical components in the system 100.

In one embodiment of the present invention, the power supply 102 may include a current protection device such as a fuse or circuit breaker, and the power source 112 may be limited to provide a current that is below the current rating of the fuse or circuit breaker. In such an embodiment, the power source 112 may continue supplying power to the power supply 102 even though a component of the power supply 102 has failed, because the incoming current will be insufficient to trigger a fuse or circuit breaker associated with the power supply 102. In this case as well as others, the smoke prevention apparatus 110 will prevent smoke and smell from occurring in the power supply as a result of a component failure.

Figure 2:
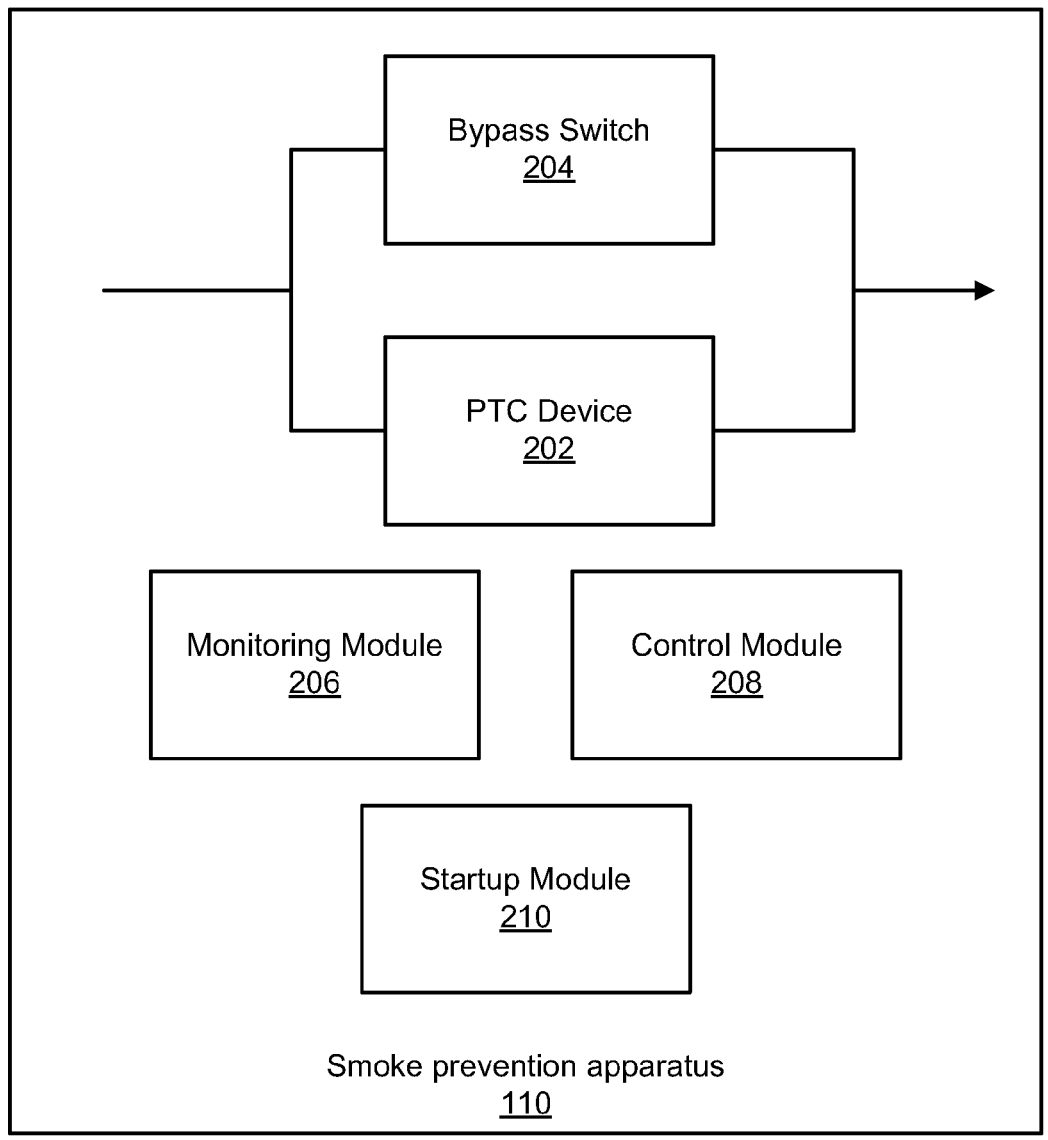
FIG. 2 is a schematic block diagram illustrating one embodiment of smoke prevention apparatus in accordance with the present invention.

FIG. 2 is a schematic block diagram illustrating one embodiment of a smoke prevention apparatus 110 in accordance with the present invention. The smoke prevention device 110 includes a positive temperature coefficient ("PTC") device 202, a bypass switch 204, a monitoring module 206, a control module 208, and a startup module 210. The smoke prevention apparatus 110 utilizes the PTC device 202 in conjunction with the bypass switch 204 to prevent smoke and smell in the power supply 102 after a component failure or other fault. Preferably, the PTC device 202 and bypass switch 204 are configured in parallel and placed at an input to a switching regulation stage of a power supply 102 such that substantially all of the current entering the switching regulation stage passes through either the PTC device 202 or the bypass switch 204.

A positive temperature coefficient device 202 is a device that increases in electrical resistance in response to an increase in temperature. One example of a PTC device 202 is a polymer positive temperature coefficient ("PPTC") device. Preferably, the PTC device is configured to have some minimum amount of resistance when cold that increases as the device temperature increases, such as when a large current passes through it. A bypass switch 204 is a device such as a solid state relay, electromechanical relay, or other type of switch that selectively makes an electrical connection to complete a circuit. For example, if the bypass switch 204 is closed, then current will be allowed to pass through the bypass switch 204. If the bypass switch 204 is open, then an open circuit situation will result and substantially all of the current will pass through the PTC device 202. Preferably, the bypass switch 204 is configured to provide a very low resistance when in the closed position.

The monitoring module 206 determines whether a voltage across a regulation switch in a switching regulator stage of the power supply 102 is below a predefined threshold voltage for greater than a predefined threshold time period. For example, suppose that an expected voltage across the regulation switch is 100 volts when the regulation switch is open, and near zero volts when the regulation switch is closed. As the regulation switch is turned on and off to regulate an output voltage of the switching regulation stage, the voltage will naturally fluctuate in value. However, the voltage across the regulation switch will be expected to stay at low value for only a short period of time (depending on the duty cycle of switch) before it will again return to a high value (i.e. 100 volts). Thus, a predefined threshold voltage may be set (i.e. 5 volts, or 10 volts) and a predefined threshold time period (i.e. 20 microseconds) may be set such that if the voltage across the regulation switch stays below the predefined threshold voltage for longer than the threshold time period, then the monitoring module 206 determines that fault has occurred in the power supply 102.

For example, one common fault in a switching power supply 102 is for a short circuit to occur across the regulation switch in response to a failure of the regulation switch or other electrical component. In the event of such a short circuit, the monitoring module 206 will determine that a fault has occurred, because the voltage across the regulation switch will remain below the threshold voltage for longer than the threshold time period. Of course, as will be recognized by those of skill in the art, failures of other components such as a switch controller, capacitor, diode, or inductor may also cause the voltage across the switch to remain too low for too long thereby causing the monitoring module 206 to detect a failure. Such failures may also be detected by the monitoring module 206.

The control module 208 controls the operation of the bypass switch 204. In one embodiment, the control module 208 opens the bypass switch 204 in response to the monitoring module 206 determining that the voltage across the regulation switch is below the threshold voltage for greater than the predefined threshold time period. This causes substantially all of the current entering the switching regulation stage to pass through the PTC device 202. If a current protection device of the power supply 102 fails to trigger (i.e. a blown fuse), the current passing through the PTC device 202 may cause the PTC device 202 to heat up thereby causing an increase in resistance. The increase in resistance will prevent an over-current situation from occurring in the switching regulation stage, which in turn will prevent smoke and smell from occurring.

In one embodiment, the resistance of the PTC device 202 is sufficient to limit current entering the switching current regulation stage to prevent damage and to prevent fire or smoke. However, an added advantage of the PTC device 202 is that as current passes through the PTC device 202, as with typical resistors, the PTC device 202 generates heat. This heat in turn causes resistance of the PTC device 202 to rise, thus further limiting current.

In another embodiment, the resistance of the PTC device 202 initially is at an undesirable level and then as resistance of the PTC device 202 rises, the current is reduced to an acceptable level as temperature in the PTC device 202 rises. For example, the resistance of the PTC device 202 may be initially high enough to cause damage or smoke. As the current passes through the PTC device 202 and generates heat, resistance of the PTC device 202 rises. In the embodiment, the PTC device 202 is chosen so that the resistance of the PTC device 202 rises to a level such that current passing through the PTC device 202 is reduced to an acceptable level.

During normal operation of the power supply 102, such as before a fault occurs, the control module 208 maintains the bypass switch 204 in an a closed position such that substantially all of the current entering the switching regulation stage passes through the closed bypass switch 204. The lower resistance of the bypass switch 204 allows the power supply 102 to operate more efficiently during normal operation when substantially all of the current passes through the bypass switch 204.

The startup module 210 also controls the bypass switch 204 during startup of the power supply 102. The operation of the startup module 210 is described in detail below with regard to FIG. 5.

Figure 3:
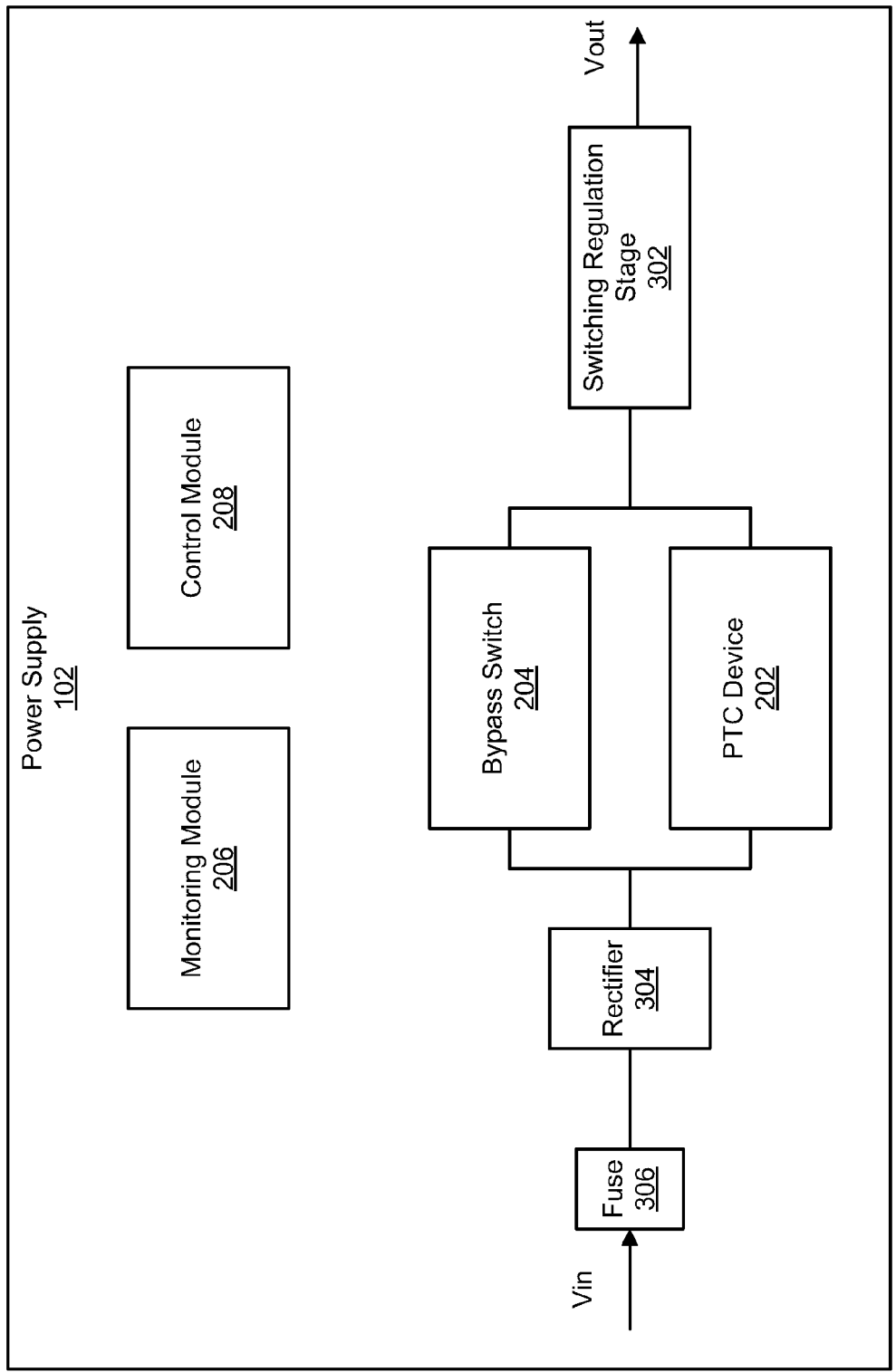
FIG. 3 is a schematic block diagram illustrating one embodiment of a power supply in accordance with the present invention.

FIG. 3 is a schematic block diagram illustrating one embodiment of a power supply 102 in accordance with the present invention. As depicted, the components of the smoke prevention apparatus 110 are integrated into the power supply 102 with the PTC device 202 and bypass switch 204 implemented in parallel at an input to a switching regulation stage 302. The monitoring module 206 and control module 208 are also included with the power supply 102. However, in other embodiments, one or more components of the smoke prevention apparatus 110 may be provided external to the power supply 102 or may be provided as an add-on component. For example, some logic components such as the monitoring module 206 or control module 208 may be provided independent of the power supply 102.

As depicted in FIG. 3, the power supply 102 includes a switching regulation stage 302, a rectifier, 304, and a fuse 306. Of course, in further embodiments, one or more additional components, including one or more additional switching regulation stages may be provided with the power supply 102. For example, in one embodiment, a separate switching regulation stage 302 may be utilized to provide various output voltages from the power supply 102. It is contemplated that a smoke prevention apparatus 110 and various components of a smoke prevention apparatus 110 may be used to prevent smoke and smell in a plurality of switching regulation stages.

The power supply 102 receives an input voltage Vin from a power source 112. In one embodiment, the input voltage may be an alternating current ("AC") voltage as is commonly provided via a conventional wall socket. The input voltage typically passes through a current protection device such as fuse 306 before entering a rectifier stage 304. In another embodiment, the current protection device is a circuit breaker. The circuit breaker may be in the power supply 102 or may be a circuit breaker in a circuit breaker panel feeding a wall socket connected to the power supply 102. In another embodiment, both a fuse 306 and a circuit breaker protect the power supply 102 from overcurrent.

The current protection device 306 is configured to disconnect power to the power supply 102 in response to an overcurrent condition in the power supply 102. Typically an overcurrent protection device has an inverse time characteristic and a current rating. Typically if current passes through the current protection device and the current is below the current rating of the current protection device, the current protection device will not open. If current passing through the current protection device is over the device's current rating, the device will eventually open, depending upon the magnitude of the current. A high current typically opens the current protection device in a short time while a current just above the current rating of the current protection device causes the current protection device to open in a relatively long period of time.

In one embodiment, the power source 112 may be a current limited source and the current limited source may limit current to the power supply 112 at a level less than the current rating of the current protection device 306 such that the current level will not result in a disconnection of power to the power supply 102. In this case, without the smoke prevention apparatus 110, damage may occur in the power supply 102 or the power supply 102 may at least produce undesirable smoke.

In one embodiment, the input voltage Vin is an AC voltage and the rectifier 304 converts the AC voltage into a direct current ("DC") voltage. The direct current voltage is applied to the inputs of the PTC device 202 and the bypass switch 204 such that input current to the switching regulation stage 302 first passes through the PTC device 202 or the bypass switch 204. The control module 208 controls the operation of the bypass switch 204 in response to one or more signals received from the monitoring module 206.

If the monitoring module 206 determines that a fault has occurred in the switching regulation stage 302, then the control module 208 opens the bypass switch 204 such that substantially all of the current entering the switching regulation stage 302 passes through the PTC device 202. As described above, this will cause the PTC device 202 to enter a higher resistance state. The PTC device 202 thereby reduces fault current in the switching regulator stage 302. In one embodiment, the increase in resistance in the PTC device 202 prevents too much current from passing through the PTC device 202 so that smoke or smell does not result from the detected fault.

During normal operation of the power supply 102, typically the control module 208 will maintain the bypass switch in a closed position such that current passes through the bypass switch 204 into the switching regulation stage 302. The switching regulation stage 302 typically regulates an output voltage Vout that may be used, for example, as an output of the power supply 102 or as an input to another stage of the power supply 102.

Figure 4:
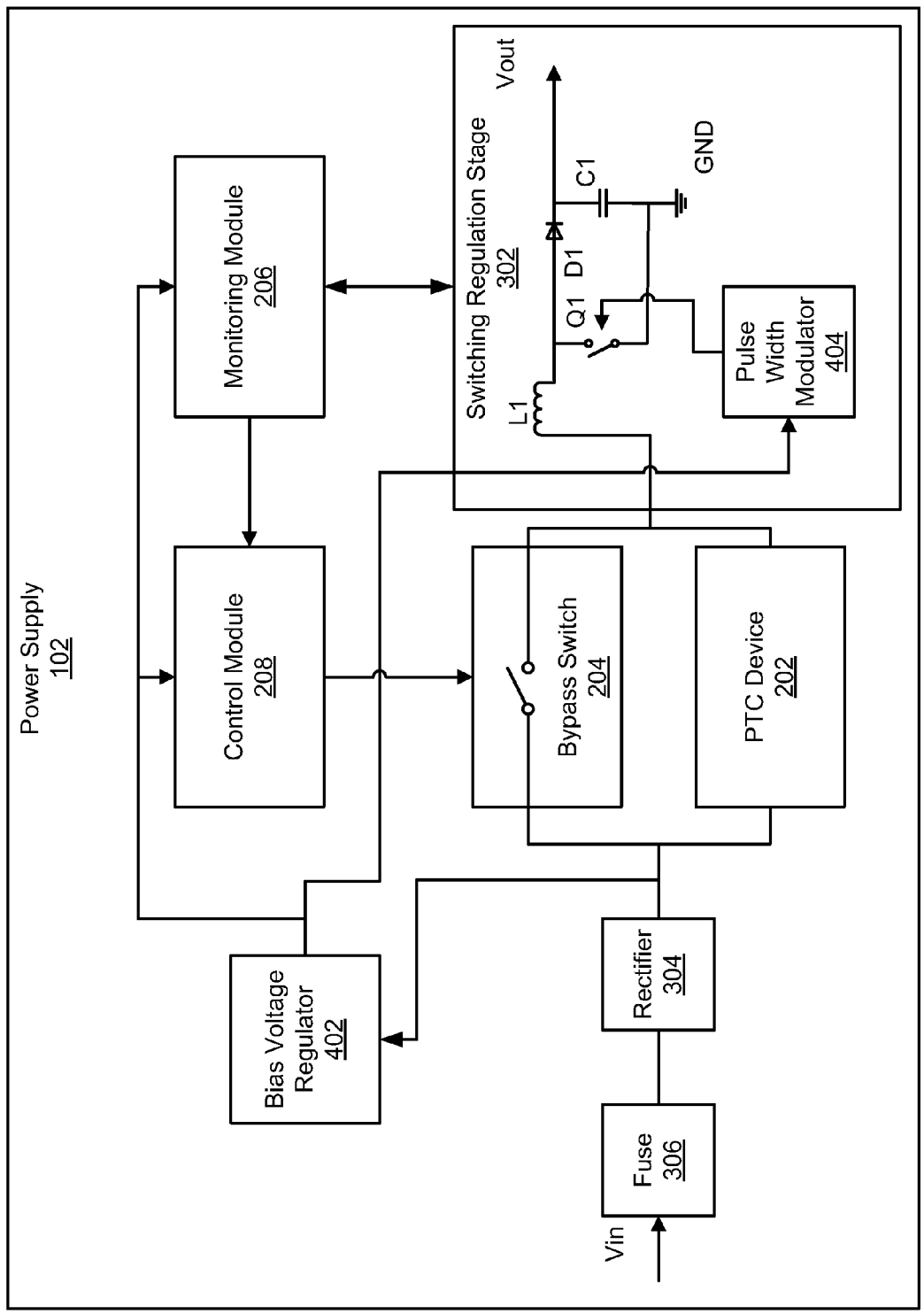
FIG. 4 is a schematic block diagram illustrating another embodiment of a power supply in accordance with the present invention.

FIG. 4 is a schematic block diagram illustrating another embodiment of a power supply 102 in accordance with the present invention. As depicted, the power supply 102 includes a bias voltage regulator 402. The switching regulator stage 302 is depicted as a boost stage wherein an output voltage Vout is regulated above an input voltage to the switching regulation stage 302 as will be recognized by those of skill in the art. The bias voltage regulator 402 receives input power from a node in the power supply 102. Typically, the bias voltage regulator 402 is connected to and receives an input voltage from a node between the PTC device 202 and the power source 112. In one embodiment, the bias voltage regulator 402 is connected to the output side of the rectifier and the bias voltage regulator 304 shares an input node with the PTC device 202 such that the bias voltage regulator 402 and the PTC device 202 receive a same input voltage. In another embodiment, the bias voltage regulator 402 is connected ahead of the rectifier 304. The bias voltage regulator 402 is configured to provide a regulated bias voltage to power various subsystems in the power supply 102 such as controllers, monitors, and the like.

In one embodiment, the bias voltage regulator 402 provides a regulated bias voltage to at least one component of the control module 208. For example, the control module 208 may include a driver for controlling a relay switch 204 or the like that receives power from the bias voltage regulator 402. In further embodiments, the logic and tasks performed by the monitoring module 206 and control module 208 may be powered by the bias voltage regulator 402.

Preferably, the bias voltage regulator 402 is connected to a node before the PTC device 202 such that in the event of a fault that causes the bypass switch 204 to open and causes the PTC device 202 to enter a high resistance state, the bias voltage regulator 402 will be able to continue providing a regulated bias voltage to the various control systems such as the monitoring module 206 and the control module 208. This allows the logic and monitoring circuits of the power supply 102 to continue to operate even though the main power train (i.e. switching regulation stage 302) is disabled.

By including a PTC device 202 instead of an NTC device, in a system 100 with a current limited power source 112 the smoke prevention apparatus 110 may be able to maintain enough voltage to the bias voltage regulator 402 such that the bias voltage regulator 402 may continue to provide a bias voltage to the power supply 102. In a system with an NTC device and a current limited power source 112, a fault, such as a regulation switch Q1 failing short, may cause voltage to the bias voltage regulator 402 to drop. Current passing through the NTC device will then cause the voltage to the bias voltage regulator 402 to drop further which may result in the bias voltage regulator 402 being unable to provide a bias voltage to components in the power supply 102. Thus the PTC device 202 is advantageous in maintaining a bias voltage to components in the power supply 102.

As depicted, the switching regulation stage 302 includes an inductor L1, a regulation switch Q1, a diode D1, and a capacitor C1. A pulse width modulator 404 is provided that controls the operation of the regulation switch Q1. Those of skill in the art will recognize that numerous additional topologies may also be used in the switching regulation stage 302 such buck, boost-like, buck-like, etc. The regulation switch Q1 is turned on and off to maintain a regulated output voltage Vout. Preferably, the switch Q1 is a metal-oxide-semiconductor field-effect transistor ("MOSFET"). In one embodiment, a topology is utilized for the switching regulation stage 302 such that a short across the regulation switch Q1 results in an increased current flow into the switching power supply 102 that is greater than a maximum rated input current for the switching power supply 102. In the depicted embodiment, the topology of the switching regulation stage 302 is that of a boost converter such that if the regulation switch Q1 fails short, current into the power supply 102 would rise dramatically. Also in the embodiment, the pulse width modulator 404 receives a regulated bias voltage from the bias voltage regulator 402.

During operation of the switching regulation stage 302, the monitoring module 206 monitors the voltage across the regulation switch Q1. If there is fault, such as a short across the regulation switch Q1, the monitoring module 206 determines that the voltage across the regulation switch Q1 is below a threshold voltage for greater than a threshold voltage (i.e. Vds<5 volts for t>20 microseconds). The time threshold would typically be set to be a value higher than a switching period corresponding to the switching frequency of the pulse width modulator 404. For example, the time threshold may be set to double the switching frequency.

The voltage threshold is typically set to a value higher than voltage across the regulation switch Q1 in an on or closed state. The voltage threshold is also typically set lower than a voltage across the regulation switch Q1 when the switch is in an open or off state. For example, the voltage threshold may be set to 5 volts where the drain-to-source voltage ("Vds") is much less than 5 volts. When the regulation switch Q1 is open, the voltage across the regulation switch Q1 may be much higher than 5 volts and may be 120-200 volts in one embodiment.

The monitoring module 206 sends a signal to the control module 208 indicating that a fault has occurred, and the control module 208 opens the bypass switch 204 such that substantially all of the current passes through the PTC device 202. Initially, because the PTC device 202 has a resistance that is typically much higher than the resistance of the bypass switch 204, current into the power supply 302 is limited. This limited current may be low enough to prevent smoke and smell. In another embodiment, the initial resistance of the PTC device may allow a current that may cause smoke or smell or other damage. In this embodiment, the current is sufficient to cause the PTC device 202 to increase in resistance thereby protecting the power supply 102 from smoke and smell.

In a system with an NTC device, over time current through the NTC device would increase and smoke and smell are typically generated and are undesirable. Preferably, the timing of the monitoring module 206, control module 208, and PTC device 202 is such that the bias voltage regulator 402 is able to continue to provide a bias voltage to the control circuits in the event of a fault in the power supply 102. For example, the PTC device 202 preferably reaches a high resistance state before a node voltage feeding the bias voltage regulator 402 drops too low. In some embodiments, a capacitor or other circuitry may also be used to protect the bias voltage regulator 402 against voltage drops caused by a fault in the power supply 102.

In a conventional power supply 102, a current protection device such as the fuse 306 is relied upon to protect the power supply 102 from smoke and smell and damage. However, in some cases the current entering the power supply 102 may be insufficient to trigger the fuse 306, but may still be sufficient to cause smoke and smell in the power supply 102. The present invention is particularly useful in such a condition, because even though the current may be insufficient to trigger the fuse 306, it may still be sufficient to cause current to flow in the PTC device 202 and/or the PTC device 202 to enter a high resistance state. This not only protects against smoke and smell, but also allows the bias voltage regulator 402 to continue providing power to various subsystems in the power supply 102 even if the switching regulator stage 302 is disabled. Thus, a significant advantage is achieved over the prior art.

Figure 5:
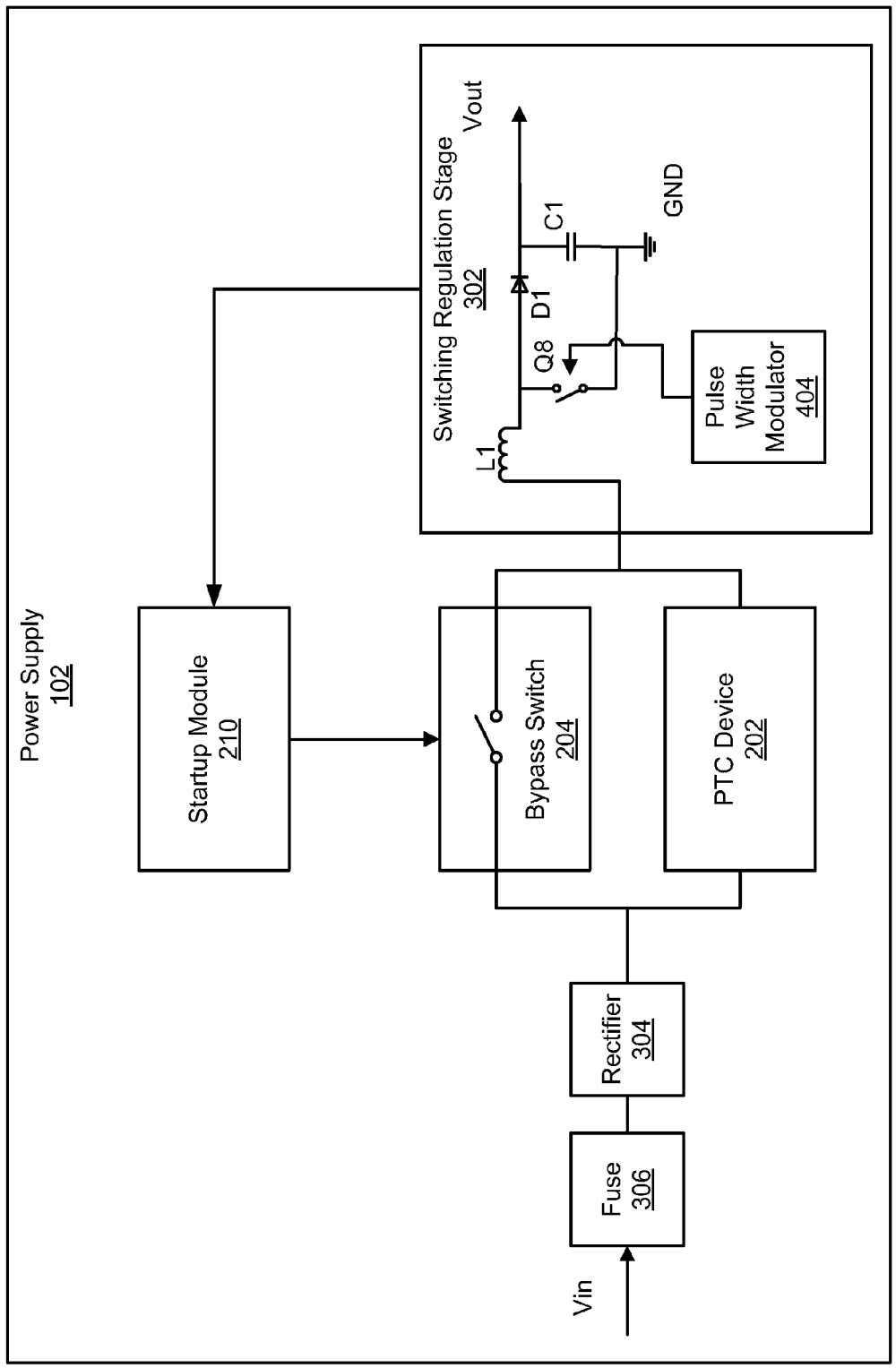
FIG. 5 is a schematic block diagram illustrating one embodiment of a power supply with a startup module in accordance with the present invention.

FIG. 5 is a schematic block diagram illustrating one embodiment of a power supply 102 with a startup module 210 in accordance with the present invention. The startup module 210 controls operation of the bypass switch 204 during startup of the power supply 102. Initially, the startup module 210 maintains the bypass switch 204 in an open position in response to startup of the power supply 102. In one embodiment, the default position for the bypass switch 204 is an open position such that no affirmative action is needed by the startup module 210 to initially maintain the bypass switch 204 in an open position.

With the bypass switch 204 in an open position, substantially all of the current entering the switching regulation stage 302 passes through the PTC device 202. Preferably, the PTC device 202 is configured with a predefined cold resistance (i.e. 8 ohms) to slow the initial surge of current into the switching regulation stage 302. This protects the power supply components from damage and helps to ensure that there are no faulty components in the power supply 102 before the power supply 102 is brought to full operation. Thus, the PTC device 202 serves an unexpected dual purpose to both prevent smoke and smell in the event of a component fault, and to provide a slightly resistive path during startup of the power supply 102.

The startup module 210 closes the bypass switch 204 in response to determining that a voltage of a predetermined node in the power supply 102 is greater than a startup voltage threshold. Upon closing the bypass switch 204, substantially all of the current entering the switching regulation stage 302 passes through the low resistance path provided by the bypass switch 204. The switching regulation stage 302 then continues normal operation until a fault occurs. Of course, should the startup module 210 fail to close the bypass switch 204 within a prescribed amount of time, the current passing through the PTC device 202 may cause the PTC device 202 to enter a high resistance state, thereby protecting the power supply 102 from an over-current condition.

Preferably, the PTC device 202 serves a dual purpose of limiting inrush current and limiting current in a fault scenario. In one embodiment, the PTC device 202 is chosen with an initial resistance that sufficiently reduces inrush current until voltage on an output of the power supply 102 or intermediate switching regulation stage 302 reaches a predetermined level. The PTC device 202 may also be chosen so that initial current in typical circumstances (i.e. power source 112 that is essentially not current limited) allows the power supply to draw a high enough current during a fault condition that the current is sufficient to open a fuse 306 or other overcurrent protection in the power supply 102. Preferably, the PTC device 202 is also chosen so that when a power source 112 is current limited such that the fuse 306 or overcurrent protection will not open and when fault current is being drawn through the PTC device 202, resistance will rise to a level to limit the fault current to a level where damage, smoke, and/or smell will not occur.

To handle both startup and fault conditions, the PTC device 202 may also be chosen so that resistance does not change significantly during startup. With an NTC device, having a high starting resistance that reduces during the startup process allows more current to flow as the output voltage rises, which is desirable. However, as mentioned above, an NTC device has the disadvantage that it allows a current increase over time during a fault. With a PTC device 220, during a startup process it is not advantageous for current to be reduced. However, during a fault condition is it advantageous to have current reduce over time. Therefore, it is preferable for the time it takes for resistance to increase in a PTC device 202 as temperature rises to be long enough so that there is no significant change during startup. Then during a fault condition, which may last much longer than startup, the resistance may rise advantageously to limit fault current, especially when the power source 112 is limited and an overcurrent protection device, like a fuse 306, is not activated.

Preferably, if there are no faults in the power supply 102, the startup voltage threshold and PTC device 202 characteristics are selected such that the power supply 102 enters normal operation (with the bypass switch 204 closed) prior to the PTC device 202 reaching a highly resistive state.

In various embodiments, different nodes of the power supply 102 may be monitored to determine when a voltage is greater than a startup voltage threshold. For example, if an output voltage Vout of the switching regulation stage 302 reaches a particular value (i.e. 100 volts), then the startup module 210 may determine that the switching regulation stage is operating normally, the components are sufficiently charged (i.e. capacitor C1), and it is safe to close the bypass switch 204. Thus, in one embodiment, the startup module 210 may determine that an output voltage Vout of the switching regulation stage 302 greater than a startup voltage threshold before closing the bypass switch 302.

In another embodiment, the switching regulation stage 302 may be a boost stage, and the startup module 210 may be configured to determine if the boost voltage of the boost stage is greater than a startup voltage threshold. In other embodiments, other nodes may be used. For example, the startup module may use a line input voltage or a voltage across the regulation switch Q1 to determine if those voltages are greater than a startup voltage threshold. In yet another embodiment, an output of the power supply 102 other than the output of the switching regulation stage 302 may be used by the startup module to compare against a startup voltage threshold.

Once the startup module 210 closes the bypass switch 204 and the power supply 102 enters normal operation, the monitoring module 206 and control module 208 may take over control of the bypass switch 204 in order to prevent smoke and smell in the power supply 102 as described above.

Figure 6:
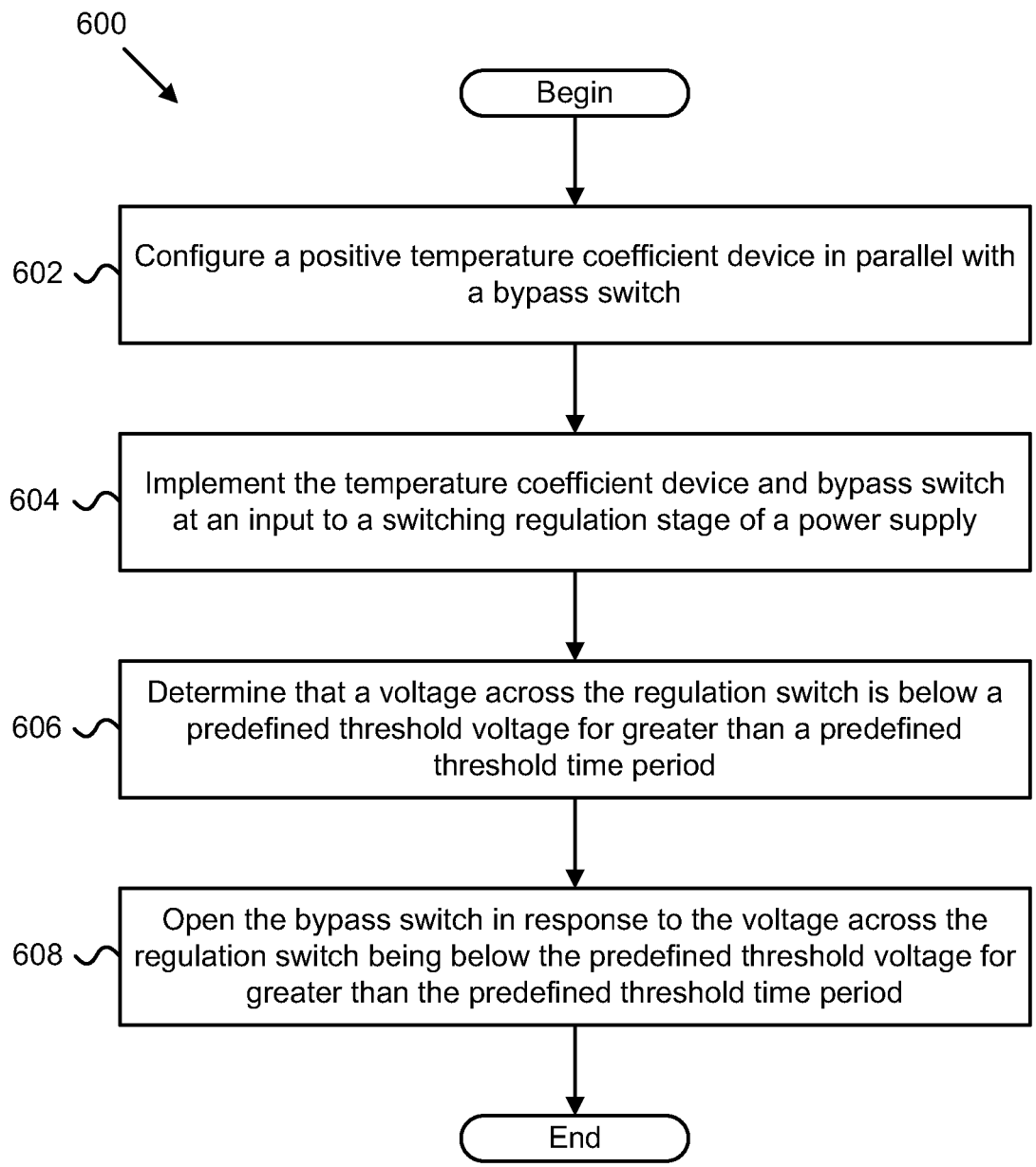
FIG. 6 is a schematic flow chart diagram illustrating one embodiment of a method for preventing smoke and smell in a power supply in accordance with the present invention.

FIG. 6 is a schematic flow chart diagram illustrating one embodiment of a method 600 for preventing smoke and smell in a power supply in accordance with the present invention. The method 600 substantially includes the embodiments and modules described above with regard to FIGS. 1-5.

The method 600 begins when a positive temperature coefficient device 202 is configured 602 in parallel with a bypass switch 204 and implemented 604 at an input to a switching regulation stage 302 of a power supply 102. The switching regulation stage 302 includes a regulation switch Q1 that is switched on and off to maintain an output voltage Vout of the switching regulation stage.

A monitoring module 206 determines 606 that a voltage across the regulation switch Q1 in the power supply 102 is below a predefined threshold voltage for greater than a predefined threshold time period. This typically indicates that fault has occurred in the power supply 102 that may result in a smoke or smell condition. For example, too much current may pass through a power supply component causing it to emit smoke as it dissipates power or to be damaged.

A control module 208 opens 608 the bypass switch 204 in response to the monitoring module 206 determining that the voltage across the regulation switch Q1 is below the predefined threshold voltage for greater than the predefined threshold time period such that substantially all of the current entering the switching regulation stage 302 passes through the PTC device 202. The current passing through the PTC device 202 causes the PTC device 202 to increase in resistance, thereby limiting the amount of current passing through the PTC device 202 into the switching regulation stage 302. This prevents a smoke or smell condition from occurring. Typically, the bypass switch 204 is maintained in a closed position during normal operation of the switching regulation stage 302 such that substantially all of the current entering the switching regulation stage 302 passes through the bypass switch.

Figure 7:
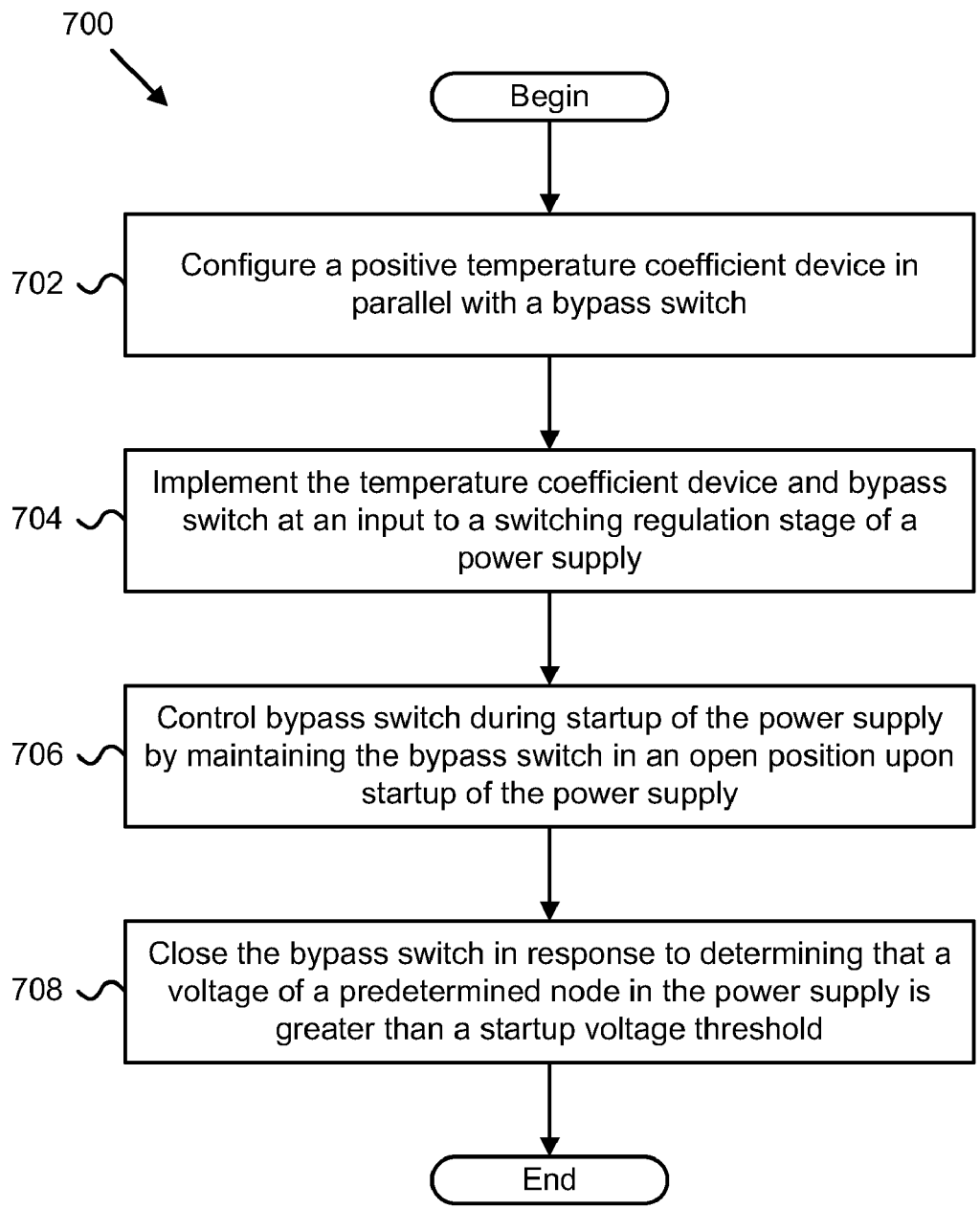
FIG. 7 is a schematic flow chart diagram illustrating one embodiment of a method for starting up a power supply in accordance with the present invention.

FIG. 7 is a schematic flow chart diagram illustrating one embodiment of a method 700 for starting up a power supply 102 in accordance with the present invention. The method 700 substantially includes the embodiments and modules described above with regard to FIGS. 1-5.

The method 700 begins when a positive temperature coefficient device 202 is configured 702 in parallel with a bypass switch 204 and implemented 704 at an input to a switching regulation stage 302 of a power supply 102. The switching regulation stage 302 includes a regulation switch Q1 that is switched on and off to maintain an output voltage Vout of the switching regulation stage.

A startup module 210 controls 706 the bypass switch 204 during startup of the power supply by maintaining the bypass switch 304 in an open position upon startup of the power supply 102. The startup module 210 monitors one or more nodes in the power supply 102 to determine whether the voltage at the one or more monitored nodes is greater than a startup voltage threshold, the startup threshold voltage corresponding to voltage indicating that it is safe to close the bypass switch 204.

The startup module 201 closes the bypass switch 204 in response to determining that a voltage of a predetermined node in the power supply 102 is greater than a startup voltage threshold and the power supply 102 begins normal operation with substantially all of the current entering the switching regulation stage 302 passing through the bypass switch 302.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. An apparatus to prevent smoke in a power supply, the apparatus comprising:
a positive temperature coefficient device configured in parallel with a bypass switch and implemented at an input to a switching regulation stage of a switching power supply, the positive temperature coefficient device comprising a device that increases in electrical resistance in response to an increase in temperature, the switching regulation stage comprising a regulation switch that is switched on and off to maintain an output voltage of the switching regulation stage;
a monitoring module that determines that a voltage across the regulation switch in the switching power supply is below a predefined threshold voltage for greater than a predefined threshold time period; and
a control module that controls operation of the bypass switch, the control module opening the bypass switch in response to the monitoring module determining that the voltage across the regulation switch is below the predefined threshold voltage for greater than the predefined threshold time period such that substantially all of the current entering the switching regulation stage passes through the positive temperature coefficient device, wherein prior to opening the bypass switch, the control module maintains the bypass switch in a closed position such that substantially all of the current entering the switching regulation stage passes through the closed bypass switch.

2. The apparatus of claim 1, further comprising a startup module that controls the bypass switch during startup of the switching power supply, the startup module maintaining the bypass switch in an open position in response to startup of the switching power supply such that substantially all of the current entering the switching regulation stage passes through the positive temperature coefficient device, the startup module closing the bypass switch in response to determining that a voltage of a predetermined node in the switching power supply is greater than a startup voltage threshold such that substantially all of the current entering the switching regulation stage passes through the bypass switch.

3. The apparatus of claim 2, wherein determining that a voltage of a predetermined node is greater than a startup voltage threshold comprises determining that an output voltage of the switching regulation stage is greater than the startup voltage threshold.

4. The apparatus of claim 3, wherein the switching regulation stage comprises a boost stage wherein the determined output voltage comprises an output voltage of the boost stage.

5. The apparatus of claim 2, wherein determining that a voltage of a predetermined node is greater than a startup voltage threshold comprises determining that a voltage across the regulation switch is greater than the startup voltage threshold.

6. The apparatus of claim 2, wherein determining that a voltage of a predetermined node is greater than a startup voltage threshold comprises determining that an output voltage of the switching power supply is greater than the startup voltage threshold.

7. The apparatus of claim 1, wherein the switching power supply comprises a current protection device that disconnects power to the switching power supply in response to an overcurrent condition in the switching power supply, and wherein the switching power supply receives input power from a current limited power source, the current limited power source configured to supply less current than is sufficient to trigger disconnection of the current protection device.

8. The apparatus of claim 7, wherein the current protection device comprises one or more of a fuse and a circuit breaker.

9. The apparatus of claim 1, further comprising a bias voltage regulator that provides a regulated bias voltage to at least one component of the control module, the bias voltage regulator connected to and receiving an input voltage from a node between the positive temperature coefficient device and a power source that provides power to the switching power supply.

10. The apparatus of claim 9, wherein the bias voltage regulator shares an input node with the positive temperature coefficient device such that the bias voltage regulator and the positive temperature coefficient device receive a same input voltage.

11. The apparatus of claim 10, wherein the bias voltage regulator continues providing a regulated bias voltage to the one or more components of the control module during operation of the bypass switch in an open state.

12. The apparatus of claim 1, wherein the positive temperature coefficient device comprises a polymer positive temperature coefficient ("PPTC") device.

13. The apparatus of claim 1, wherein the bypass switch comprises one of a solid state relay and an electromechanical relay.

14. The apparatus of claim 1, wherein the regulation switch comprises a metal-oxide-semiconductor field-effect transistor ("MOSFET").

15. The apparatus of claim 1, wherein the switching regulation stage is configured such that a short across the regulation switch results in an increased current flow into the switching power supply that is greater than a maximum rated input current for the switching power supply.

16. A system to prevent smoke in a power supply, the system comprising:
a switching power supply configured to provide power to one or more electronic devices;
a positive temperature coefficient device configured in parallel with a bypass switch and implemented at an input to a switching regulation stage of the switching power supply, the positive temperature coefficient device comprising a device that increases in electrical resistance in response to an increase in temperature, the switching regulation stage comprising a regulation switch that is switched on and off to maintain an output voltage of the switching regulation stage;
a monitoring module that determines that a voltage across the regulation switch in the switching power supply is below a predefined threshold voltage for greater than a predefined threshold time period; and
a control module that controls operation of the bypass switch, the control module closing the bypass switch during normal operation of the switching regulation stage such that substantially all of the current entering the switching regulation stage passes through the closed bypass switch, the control module opening the bypass switch in response to the monitoring module determining that the voltage across the regulation switch is below the predefined threshold voltage for greater than the predefined threshold time period such that substantially all of the current entering the switching regulation stage passes through the positive temperature coefficient device.

17. The system of claim 16, further comprising one or more electronic devices that receive regulated power from the switching power supply.

18. The system of claim 17, wherein at least one of the one or more electronic devices comprises one of a blade server, peripheral component interconnect ("PCI") card, personal computer, laptop, router, switch, personal digital assistant, appliance, and digital media player.

19. A method to prevent smoke in a power supply, the method comprising:
configuring a positive temperature coefficient device in parallel with a bypass switch and implementing the positive temperature coefficient device at an input to a switching regulation stage of a switching power supply, the positive temperature coefficient device comprising a device that increases in electrical resistance in response to an increase in temperature, the switching regulation stage comprising a regulation switch that is switched on and off to maintain an output voltage of the switching regulation stage;
determining with a monitoring module that a voltage across the regulation switch in the switching power supply is below a predefined threshold voltage for greater than a predefined threshold time period; and
controlling with a control module the operation of the bypass switch, the control module opening the bypass switch in response to the monitoring module determining that the voltage across the regulation switch is below the predefined threshold voltage for greater than the predefined threshold time period such that substantially all of the current entering the switching regulation stage passes through the positive temperature coefficient device, wherein prior to opening the bypass switch, the control module maintains the bypass switch in a closed position such that substantially all of the current entering the switching regulation stage passes through the closed bypass switch.

20. An apparatus to prevent smoke in a power supply, the apparatus comprising:
a positive temperature coefficient device configured in parallel with a bypass switch and implemented at an input to a switching regulation stage of a switching power supply, the positive temperature coefficient device comprising a device that increases in electrical resistance in response to an increase in temperature, the switching regulation stage comprising a regulation switch that is switched on and off to maintain an output voltage of the switching regulation stage;

a startup module that controls the bypass switch during startup of the switching power supply, the startup module maintaining the bypass switch in an open position in response to startup of the switching power supply such that substantially all of the current entering the switching regulation stage passes through the positive temperature coefficient device, the startup module closing the bypass switch in response to determining that a voltage of a predetermined node in the switching power supply is greater than a startup voltage threshold such that substantially all of the current entering the switching regulation stage passes through the bypass switch;

a monitoring module that determines that a voltage across the regulation switch in the switching power supply is below a predefined threshold voltage for greater than a predefined threshold time period;

a control module that controls operation of the bypass switch, the control module opening the bypass switch in response to the monitoring module determining that the voltage across the regulation switch is below the predefined threshold voltage for greater than the predefined threshold time period such that substantially all of the current entering the switching regulation stage passes through the positive temperature coefficient device, wherein prior to opening the bypass switch, the control module maintains the bypass switch in a closed position such that substantially all of the current entering the switching regulation stage passes through the closed bypass switch; and a bias voltage regulator that provides a regulated bias voltage to at least one component of the control module, the bias voltage regulator configured to connect to and receive an input voltage from a node between the temperature coefficient device and a power source that provides power to the switching power supply.

* * * * *